United States Patent [19]
Cornette

[11] Patent Number: 5,524,902
[45] Date of Patent: Jun. 11, 1996

[54] METHOD AND CARTRIDGE SEAL FOR PACKAGING A VALVE

[76] Inventor: Kevin R. Cornette, 5750 Cypress St., St. Francisville, La. 70775

[21] Appl. No.: 403,934

[22] Filed: Mar. 14, 1995

[51] Int. Cl.$^6$ ........................................... F16J 15/18
[52] U.S. Cl. ........................ 277/1; 277/9; 277/35; 277/115; 251/214
[58] Field of Search ............. 277/1, 9, 9.5, 35, 277/104, 112, 115, 117; 251/214; 137/315, 316, 317

[56] References Cited

U.S. PATENT DOCUMENTS

| | | | |
|---|---|---|---|
| 458,453 | 8/1891 | Goodrich | 277/112 |
| 779,700 | 1/1905 | Fogh | 277/115 |
| 1,068,337 | 7/1913 | Hahn . | |
| 1,576,376 | 3/1926 | Sudekum | 277/115 |
| 1,605,976 | 11/1926 | Osborn | 277/112 |
| 1,704,152 | 3/1929 | Stephens et al. . | |
| 1,955,831 | 4/1934 | Raybould . | |
| 2,385,156 | 9/1945 | Newell . | |
| 2,902,302 | 9/1959 | Ackermann . | |
| 3,004,783 | 10/1961 | Webb | 277/112 |
| 3,218,087 | 11/1965 | Hallesy | 277/112 |
| 3,468,566 | 9/1969 | Nietzel . | |
| 3,975,026 | 8/1976 | Boyle et al. | 277/9 |
| 4,046,389 | 9/1977 | Holzenberger . | |
| 4,468,039 | 8/1984 | Le et al. | 277/112 |

FOREIGN PATENT DOCUMENTS

| | | | |
|---|---|---|---|
| 9836 | 5/1901 | United Kingdom | 277/115 |
| 330091 | 6/1930 | United Kingdom . | |
| 606121 | 8/1948 | United Kingdom | 251/214 |
| 2058247 | 4/1981 | United Kingdom | 277/112 |

OTHER PUBLICATIONS

Electronics, Apr. 1945, p. 224.

*Primary Examiner*—Scott W. Cummings
*Attorney, Agent, or Firm*—Richard C. Litman

[57] ABSTRACT

A packing system, for providing a seal around a valve stem, including a packing cartridge and a bushing. The packing cartridge includes a sleeve which has a tapered central passage. The sleeve also has external male threads and a hex head. Packing material is attached to the tapered central passage of the sleeve using an adhesive. The sleeve together with the packing material form the packing cartridge. The bushing also has a tapered central passage. The packing of the present invention is applied by sliding the bushing around the valve stem, and then sliding the packing cartridge around the valve stem. Once the bushing is seated in the stuffing-box of the valve, the sleeve is tightened down into the stuffing-box, thus squeezing the packing material and creating a seal around the valve stem.

7 Claims, 2 Drawing Sheets

METHOD AND CARTRIDGE SEAL FOR PACKAGING A VALVE

BACKGROUND OF THE INVENTION

1. Field of the Invention

The present invention relates to a packing device and a method for packing the stuffing-box of valves used for controlling the flow of process fluids in industry.

2. Description of the Prior Art

Referring to FIG. 4 a prior art valve is seen. When the valve is opened, process fluid can flow around the valve stem 19 and leak to the outside environment unless steps are taken to provide a positive seal around the valve stem. In accordance with standard practice, segmented rings 70, called packing rings, are stacked around the valve stem in the stuffing-box 16. They are then crushed down in the stuffing-box by a gland follower 72. Compressive force is applied to the gland follower by the yoke 74. The yoke 74 is retained in place by bolts 76,78. The bolts 76,78 matingly engage threaded holes 80,82 in bosses 84,86 on either side of the stuffing-box 16. The bonnet 28 supports the threaded portion of the stem 22. Turning the hand wheel 30 moves the stem 19, and the attached gate 20, up and down within the valve body 12.

The conventional method of preventing leakage around the valve stem suffers from a number of drawbacks. First, uneven torquing of the bolts 76,78, also known as gland fasteners, can cause the gland follower 72 and the stem 19 to bind, and/or the packing to leak due to the gland follower becoming tilted relative to the valve stem. Second, the old method of replacing the packing is time consuming and tedious, requiring the loosening of the gland fasteners, removing the yoke, removing the gland follower, removing the old packing using packing picks and pullers, and using a flashlight and mirror to check the stuffing-box for cleanliness. Reassembly of the valve is also time consuming because of the requirement that the gland fasteners be evenly tightened in order to prevent the binding and leakage mentioned previously.

To overcome the drawbacks enumerated above alternative methods and arrangements for valve packing have been proposed in the prior art.

U.S. Pat. No. 1,068,337, issued to Hahn, shows two tapering compression fittings which compress packing material to provide a seal around a moving shaft. Hahn does not show a bushing, having a tapered central passage, designed to be seated in the stuffing-box of a valve.

U.S. Pat. No. 1,704,152, issued to Stephens et al., shows a stuffing-box for sealing around a cable inserted into a pipe. Stephens et al. does not show a bushing having a tapered central passage.

U.S. Pat. No. 1,955,831, issued to Raybould, shows connectors for joining smooth pipe sections together. The connectors are secured to the pipe sections by compressing packing material between various compression fittings. Raybould does not show a bushing, having a tapered central passage, designed to be seated in the stuffing-box of a valve.

U.S. Pat. No. 2,385,156, issued to Newell, shows a pipe coupling for smooth pipe. The coupling includes two compression fittings which compress packing material between each other to secure the coupling to the pipe joint. Newell does not show a bushing having a tapered central passage.

U.S. Pat. No. 2,902,302, issued to Ackermann, shows a stuffing-box for sealing around the pump jack of an oil well. Ackermann does not show a bushing having a tapered central passage.

U.S. Pat. No. 3,468,566, issued to Nietzel, shows a compression fitting which compresses a ferrule to seal a pipe joint. Nietzel does not show a bushing having a tapered central passage.

British Patent Document Number 330,091, by Stephens, shows a packing gland for use in sealing around the spindles of the fuel valves of Diesel engines. The packing gland shown in British Document '091 includes a gland nut having a tapered central passage. However, British Document '091 does not show a bushing having a tapered central passage. Further, unlike the present invention, the bushing in British Document '091 is designed to fit into the central passage of the gland nut.

An article on page 224 of the April 1945 issue of Electronics magazine, shows a packing gland for use in sealing around propeller shafts and drive shafts of water pumps. The packing gland shown in Electronics magazine includes a cast case and a packing nut which threadably engages the cast case. A quantity of graphite impregnated cord is squeezed between the cast case and the packing nut to seal around the shaft. The surfaces of the cast case and the packing nut, which engage the graphite impregnated cord, are tapered. The packing gland shown in Electronics magazine does not include a bushing, having a tapered central passage, which can be seated in the stuffing-box of a valve. Further, the packing gland shown in Electronics magazine does not teach or suggest adhesively attaching the packing material to the tapered central passage of a threaded sleeve.

None of the above inventions and patents, taken either singly or in combination, is seen to describe the instant invention as claimed.

SUMMARY OF THE INVENTION

The present invention is a packing means and a method for providing a seal around a valve stem. The packing means includes a packing cartridge and a bushing. The packing cartridge includes a sleeve which has a tapered central passage. The sleeve has external male threads which can matingly engage internal female threads provided in the stuffing-box. In addition, the sleeve has a hex head to allow the sleeve to be tightened within the stuffing-box by a single wrench. Packing material is attached to the tapered central passage of the sleeve using an adhesive. The sleeve together with the packing material form the packing cartridge. The bushing also has a tapered central passage which tapers in the direction opposite the direction in which the central passage of the sleeve tapers.

The packing of the present invention is applied by sliding the bushing around the valve stem, and then sliding the packing cartridge around the valve stem. Once the bushing is seated in the stuffing-box, the sleeve is tightened down into the stuffing-box, thus squeezing the packing material and creating a seal around the valve stem.

The present invention avoids the binding and leaking associated with the packing glands of prior art valves, since only a single fastener, i.e. the sleeve, needs to be tightened to compress the packing material into sealing engagement with the valve stem. In addition, the present packing system can be retrofitted to existing valves by simply running a tap through the stuffing-box to provide the necessary female threads. Further, the packing system of the present invention does not require any special tools to remove or install, a conventional wrench being all that is required to remove or install the packing cartridge.

Accordingly, it is a principal object of the invention to provide a sealing arrangement for sealing around a valve stem which avoids the problems associated with the uneven torquing of the gland fasteners.

It is another object of the invention to provide a sealing arrangement for sealing around a valve stem which has a longer life than conventional packing used in existing valves.

It is yet another object of the invention to reduce the time required to replace the packing in the glands of flow control valves.

It is a further object of the invention to provide a sealing arrangement for sealing around a valve stem which can easily be retrofitted to existing valves.

Still another object of the invention is to eliminate the need for specialized tools to replace the packing in the glands of valves.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
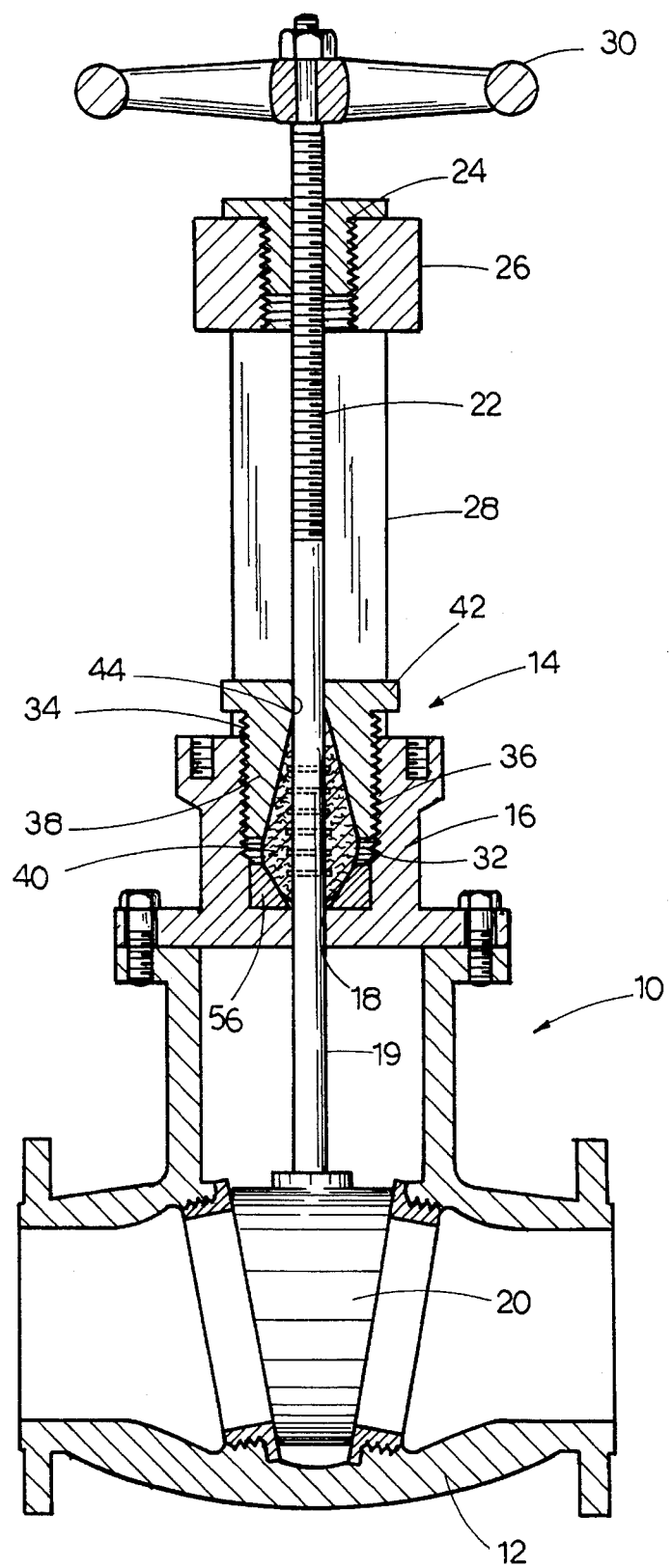
FIG. 1 is a cross sectional view of a gate valve incorporating the gland packing system of the present invention.
Figure 2:
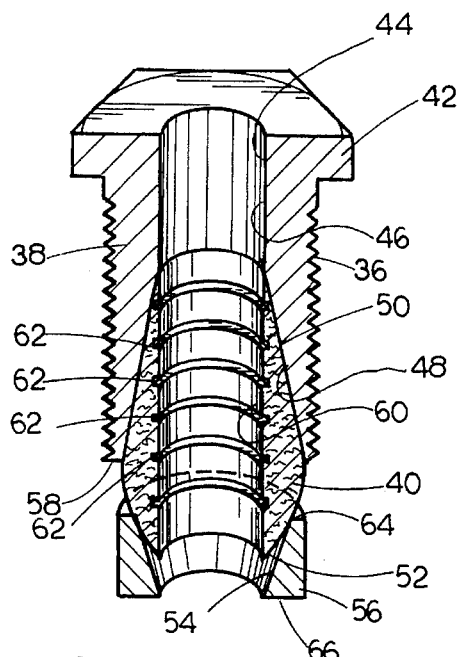
FIG. 2 is cutaway perspective view of the gland packing system of the present invention.

The present invention is directed to a packing system for providing a seal around a valve stem. Referring to FIGS. 1 and 2, a valve 10 is shown incorporating the packing system of the present invention. The portion of the valve constituting the sealing mechanism for sealing the inside of the valve body 12 from the atmosphere, is known as the gland 14. The gland includes a stuffing-box 16. The stuffing-box has a central opening 18 through which the valve stem 19 passes. The end of the valve stem, within the valve body, is attached to a gate 20. A threaded portion of the valve stem 22 matingly engages threads in a bushing 24. The bushing 24 is supported by a collar 26 which is in turn supported by the bonnet 28. Turning the hand wheel 30 moves the stem 19, and the attached gate 20, up and down within the valve body 12.

The stuffing-box 16 has internal female threads 32 provided on its sidewall. The packing cartridge 34 has male external threads 36 which matingly engage the female threads 32 of the stuffing-box. The packing cartridge includes a sleeve 38 and packing material 40. The sleeve 38 is cylindrical and has male threads 36 on its external surface. A first end of the sleeve is provided with a hex head 42. The hex head 42 facilitates the use of a wrench for tightening the packing cartridge 34 within the stuffing-box 16.

Extending along the entire length of the sleeve 38 is a central passage 44. The passage 44 extends along the central longitudinal axis of the sleeve 38. The passage 44 has a constant diameter portion 46 and a tapered portion 48. The diameter of the constant diameter portion 46 of the central passage 44 is slightly larger than the outside diameter of the valve stem 19 so that the valve stem 19 can rotate without interference from the constant diameter portion 46 of the central passage 44. The tapered portion 48 of the central passage 44 is in a frustoconical shape, increasing in diameter from the diameter of the constant diameter portion 46 of the passage 44 to a diameter approximately equal to the outside diameter of the sleeve 38.

The packing material 40 has first and second frustoconical ends 50,52 which are dimensioned and configured to fit in the tapered portion 46 of the passage 44 and the central passage 54 of bushing 56, respectively. The second frustoconical end of packing material 40 protrudes beyond the second end 58 of the sleeve 38. The packing material 40 is fixed to the tapered portion 48 of central passage 44 by an adhesive, thereby allowing the sleeve 38 and packing material 40 to be removed and installed as a unit, referred to herein as the packing cartridge. The packing 40 also has a central passage 60 in registry with the constant diameter portion 46 of the central passage 44. The central passage 60 of the packing material 40 is provided with a series of grooves 62 along its length. The grooves 62 ensure that the packing material compresses uniformly, thereby maximizing the area of the valve stem 19 sealingly contacted by the packing material 40. The packing material 40 may be made of plastic, graphite, or any other suitable material.

The bushing 56 is cylindrical in shape and has a first end 64 and a second end 66. The second end 66 has a flat annular surface which contacts the bottom of the stuffing-box 16 when the bushing 56 is seated in the stuffing-box. Extending between the first and second ends of the bushing 56 is a central, frustoconical passage 54. The passage 54 increases in diameter from a minimum proximate the flat annular surface 66 to a maximum at the first end 64 of the bushing 56. The minimum diameter of the frustoconical passage 54 is slightly larger than the outside diameter of the valve stem 19, and the maximum diameter of passage 54 is approximately equal to the outside diameter of the bushing 56.

The packing of the present invention is applied by sliding the bushing 56 around the valve stem 19, and then sliding the packing cartridge 34 around the valve stem 19. Once the bushing 56 is seated in the stuffing-box 16, the sleeve 38 is tightened down into the stuffing-box, thus squeezing the packing material 40 and creating a seal around the valve stem 19. Initially, the end of the packing material 52 protruding from the sleeve 38 conforms to the tapered passage 54 in the bushing 56, thus forming a primary seal around the valve stem 19. As the packing cartridge 34 is tightened further, the tapered portion of the passage 44 in sleeve 38 compresses the grooved sections 62 of the packing material 40 creating a secondary seal around the valve stem 19. Pipe dope or pipe thread sealant can be applied to the male threads 36 on the sleeve 38, thus forming a labyrinth seal between the packing cartridge and the stuffing-box when the packing cartridge 34 is screwed into the stuffing-box 16. The labyrinth seal completes the sealing of the valve body 12 from the atmosphere.

The packing system of the present invention can be retrofitted on existing valves by tapping the stuffing-box with a fine thread tap. The compression bushing 56 is then seated at the bottom of the stuffing-box 16. The valve packing cartridge 34 is then fitted in the stuffing-box and screwed into the stuffing-box until tightened. The packing cartridge can be easily adjusted as required to stop leakage. The tapered bushing 56 acts as a counter seal and reduces the distance that the cartridge 34 has to travel to seal the stem 19.

The compression bushing 56 is preferably made of corrosion-resistant material, and snugly fits around the valve stem 19.

Figure 3:
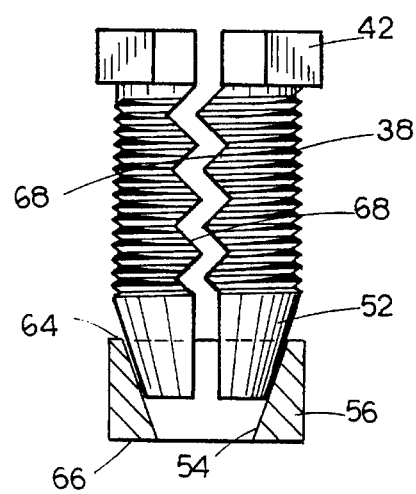
FIG. 3 is an elevational view of the second embodiment of the present invention showing the chevron split in the packing cartridge.
Figure 4:
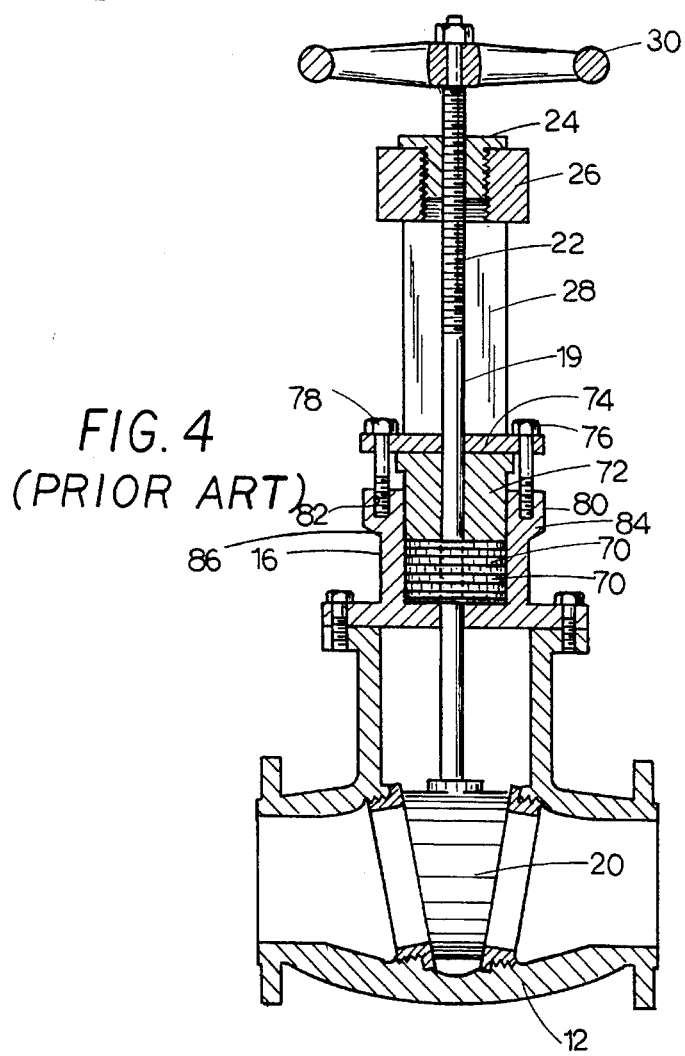
FIG. 4 is a cross sectional view of a prior art valve showing the gland packing conventionally used in such valves.

Referring to FIG. 3, an alternate embodiment of the present invention is seen. In this alternate embodiment, the packing cartridge 34 is made in two pieces formed by providing a chevron split 68 in the packing cartridge. This split design allows easier installation of the packing cartridge around the valve stem.

The packing cartridge of the present invention can be manufactured to fit different stem and stuffing-box diameters. The hex head affords single wrench even torquing of the packing cartridge. The threaded sleeve allows smooth incremental adjustment of the compressive force applied to the packing material.

The packing cartridge of the present invention allows automatic even distribution of the pressure required to seal around the valve stem. Thus the present invention reduces the labor required for repacking valves, and minimizes the exposure of workers to the process fluid. This is especially important when the process fluid is hazardous, at high temperature and/or radioactive. The packing cartridge of the present invention requires no special tools, being installable using merely a single wrench, thus obviating the need for packing picks, pullers, mirrors, or flashlights.

If the packing cartridge of the present invention is sized such that after installation, four or five threads are exposed above the top of the stuffing-box, the compressive force applied to the packing can be adjusted as the packing wears. This arrangement will allow the same packing material to provide satisfactory sealing for a prolonged period of time, thus allowing the present invention to outlast conventional packing for years.

The packing cartridge of the present invention can be retrofitted on most valves in about the same time that is required to remove and replace conventional packing.

If the packing cartridge of the present invention is incorporated into newly manufactured valves, the cost of such valves is drastically reduced because of the savings in material costs due to the elimination of the need for yokes, gland followers, gland fasteners, etc.

It is to be understood that the present invention is not limited to the embodiments described above, but encompasses any and all embodiments within the scope of the following claims.

I claim:

1. A packing system for providing a seal around a valve stem comprising:

a cylindrical sleeve having first and second ends, and an outside surface, male threads being provided on said outside surface of said sleeve, said sleeve further having a first central passage extending from said first end of said sleeve to said second end of said sleeve, said first central passage having a constant diameter portion extending from said first end of said sleeve for a predetermined distance, and said first central passage having a tapered portion extending between said constant diameter portion and said second end of said sleeve, said constant diameter portion having a first diameter, and said tapered portion increasing in diameter from said first diameter to a second diameter at said second end of said sleeve, said second diameter being larger than said first diameter;

a packing material having a frustoconical first end matingly fitting and adhesively fixed to said tapered portion, and a frustoconical second end, said second end of said packing material decreasing in diameter from a third diameter, proximate said second end of said sleeve, to a fourth diameter, smaller than said third diameter, distal from said second end of said sleeve, said packing material having a second central passage in registry with said first central passage; and a bushing having first and second ends, said bushing having a third central passage, said third central passage having a smaller diameter at said second end of said bushing, than at said first end of said bushing, said third central passage being engageable with said second end of said packing material, whereby when said bushing is seated in a stuffing-box of a valve and said sleeve is tightly screwed into the stuffing-box, said packing material is squeezed therebetween thus providing a seal around a valve stem passing through the stuffing-box.

2. The packing system according to claim 1, wherein a series of grooves are provided along said second central passage, whereby said packing material is uniformly compressed about the valve stem.

3. The packing system according to claim 1, wherein said sleeve and said packing material fixed thereto form a single unit, and said single unit is split into two pieces using a chevron split extending between the first end of said sleeve and said second end of said packing material.

4. The packing system according to claim 1, wherein said sleeve is provided with a hex head at said first end of said sleeve.

5. The packing system according to claim 1, wherein said packing material is made from a material selected from the group consisting of plastic and graphite.

6. A method for providing a seal around a valve stem using the packing system of claim 1, comprising the steps of:

inserting said bushing into a stuffing-box of a valve with said second end of said bushing being inserted first;

inserting said sleeve with said packing material fixed thereto into the stuffing-box such that said male threads engage female threads provided in the stuffing-box; and turning said sleeve until said sleeve is tightly screwed into the stuffing-box, whereby said packing material is squeezed between said bushing and said sleeve, thus providing a seal around a valve stem passing through the stuffing-box.

7. The method for providing a seal around a valve stem according to claim 6, wherein the valve is a preexisting valve having a stuffing-box lacking the female threads, and the female threads are formed by first running a tap through the stuffing-box.

\* \* \* \* \*

UNITED STATES PATENT AND TRADEMARK OFFICE
CERTIFICATE OF CORRECTION

PATENT NO. : 5,524,902
DATED : June 11, 1996
INVENTOR(S) : Kevin R. Cornette

It is certified that error appears in the above-indentified patent and that said Letters Patent is hereby corrected as shown below:

On the title page, item [54], in the title change "PACKAGING" to -- PACKING --.

Under Col. 1, Line 2, in the title, change "PACKAGING" to -- PACKING --.

Signed and Sealed this

Fourth Day of February, 1997

Attest:

BRUCE LEHMAN

*Attesting Officer*   *Commissioner of Patents and Trademarks*